Feb. 3, 1959 W. S. DRUZ 2,872,507

SYSTEM FOR TRANSLATING A D. C. COMPONENT

Filed June 7, 1955 4 Sheets-Sheet 1

WALTER S. DRUZ
*INVENTOR.*

BY Francis W. Lenotty

HIS ATTORNEY

Feb. 3, 1959 W. S. DRUZ 2,872,507

SYSTEM FOR TRANSLATING A D. C. COMPONENT

Filed June 7, 1955 4 Sheets-Sheet 2

WALTER S. DRUZ
*INVENTOR.*

BY Francis W. Crotty

HIS ATTORNEY.

Feb. 3, 1959 W. S. DRUZ 2,872,507

SYSTEM FOR TRANSLATING A D. C. COMPONENT

Filed June 7, 1955 4 Sheets-Sheet 3

WALTER S. DRUZ
*INVENTOR.*

BY Francis W. Crotty

HIS ATTORNEY.

Feb. 3, 1959 W. S. DRUZ 2,872,507

SYSTEM FOR TRANSLATING A D. C. COMPONENT

Filed June 7, 1955

4 Sheets-Sheet 4

United States Patent Office 2,872,507

Patented Feb. 3, 1959

2,872,507

SYSTEM FOR TRANSLATING A D. C. COMPONENT

Walter S. Druz, Bensenville, Ill., assignor to Zenith Radio Corporation, a corporation of Delaware Application June 7, 1955, Serial No. 513,757

12 Claims. (Cl. 178—5.1)

This invention pertains to a system for translating an intelligence signal which has both an A. C. and a D. C. component. While the invention is applicable to any system wherein it is desired to transmit a signal having both an A. C. component and a D. C. or very low frequency component, it has particular application to a distortion problem which may be encountered in a subscription television system and will be described in that environment.

Numerous secrecy systems have been proposed in which an intelligence signal, for example an audio signal, is coded by altering some characteristic thereof, such as phase, at spaced time intervals determined by a coding schedule made known only to authorized receivers. Most such systems do effect coding or scrambling of the intelligence signal but the signal, as coded, may have a D. C. component in addition to an A. C. component. Most transmitters of conventional design are not capable of transmitting a D. C. component so that only the A. C. portion of the coded signal is radiated. When the A. C. component alone is applied to the decoding apparatus of the receiver and the output therefrom is utilized to energize a sound reproducer, distortion results. Such distortion is inevitable unless the decoder operates upon the same signal as that produced by the coder at the transmitter and the necessary identity of signals is destroyed when the transmitter radiates less than all components of the coded signal. This identity may also be destroyed in the receiver if the coupling networks do not translate the low frequency components of the received signal.

Of course, it is theoretically possible to employ a perfect, carefully designed, D. C. modulator in a transmitter, such as in a frequency modulated audio transmitter, that has a high degree of stability. Moreover, a perfect frequency detector may be used at the receiver to reproduce the D. C. component. If the circuits employed are not absolutely stable in operation, however, objectionable frequency drift results. As a consequence, it is impractical to transmit and reproduce a D. C. component of a coded intelligence signal in this manner.

It is, accordingly, an object of the present invention to provide a novel arrangement for translating a D. C. or very low frequency component of an intelligence signal.

It is another object of the invention to provide a new and improved secrecy communication system for producing a decoded intelligence signal relatively free of distortion.

It is still another object of the invention to provide an improved audio decoding arrangement for a subscription television system for producing a distortion-free audio signal.

It is an additional object to provide a receiver for utilizing a complex modulated main carrier wave having one modulation component comprising a sub-carrier signal representing the D. C. component of an intelligence signal and other modulation component representing the A. C. component of the same signal.

It is a further object of the invention to provide a receiver for utilizing a transmission representing an audio signal which has been subjected to a coding function and converted into a coded audio signal having a A. C. component and a D. C. component which components are individually represented by separate modulations included within the transmission.

The present invention comprises a novel arrangement for preventing distortion in a secrecy communication system that would otherwise arise from failure to transmit and reproduce the D. C. and low frequency components of the coded signal. The arrangement is characterized by the use of relatively inexpensive and yet dependable circuitry at the transmitter and also at the receiver. At the transmitter, the D. C. component is modulated on a sub-carrier and then both the A. C. component and the D. C. modulated sub-carrier are modulated on a common main carrier for transmission to a receiver.

A receiver, in accordance with one aspect of the invention, is constructed to utilize a transmission representing an uncoded intelligence signal which has been subjected to a coding function and converted into a coded intelligence signal having an A. C. component and a D. C. component individually represented by separate modulations included within the transmission. The receiver has first demodulating means for deriving the separate modulations of the transmission. Decoding apparatus is provided for performing a decoding function which is complementary to the originally employed coding function. Second demodulating means, including the decoding apparatus, responds conjointly to the separate modulations of the transmission to derive a demodulated signal corresponding to the uncoded intelligence signal. Finally, the receiver includes means for applying the separate modulations of the transmission to the second demodulating means.

The features of this invention which are believed to be new are set forth with particularity in the appended claims. The invention, together with further objects and advantages thereof, may best be understood, however, by reference to the following description in conjunction with the accompanying drawings, in which:

Before considering the structural and operational details of the illustrated embodiments of the invention, it is helpful to discuss the D. C. component which arises from a particular manner of coding an audio signal and the distortion which this component may introduce into the decoded audio signal.

In accordance with one effective scrambling technique, the phase of the audio signal is inverted from time to time as determined by amplitude changes of a coding signal of square wave shape. The coding signal may be phase modulated about a mean frequency to increase the security of the system. It has been found experimentally that phase inversion of the audio at the rate of approximately 500 times per second achieves effective sound coding in that intelligibility is substantially completely destroyed. However, it has also been found that when a control signal of square wave form having a frequency in the audio spectrum is employed to determine the times of phase inversion, the coded audio signal has a D. C. component.

Figure 1:
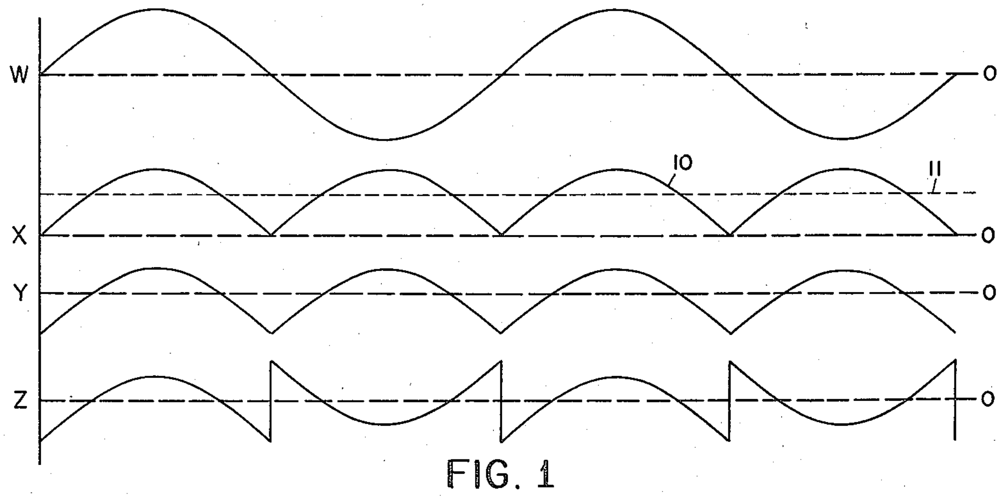
Figure 1 is a series of wave forms illustrating the phenomenon which gives rise to distortion in a particular type of coded audio system.

Consider, for example, the sine wave of curve W in Figure 1 and assume it to represent an audio signal having a frequency of 500 cycles per second. If that signal is subjected to phase inversions determined by the amplitude excursions of a 500 cycle square wave signal and it should happen that the inversions occur at the zero points in each cycle, where the waveform crosses the zero reference axis, the coded audio signal of curve X results. This signal is similar to that developed by a full wave rectifier and has an A. C. component 10 as well as a D. C. component represented by the dashed construction line 11.

When the coded signal of curve X is transmitted by means of conventional transmitter equipment, the D. C. component may be lost or it may be lost through the use of A. C. coupling networks in the receiver, leaving in either event only the A. C. component of curve Y for application to the decoding circuit. It will be noted that the zero signal points in curve X are points of considerable negative potential in curve Y. When the signal of curve Y is subjected to a decoding function at the receiver, it undergoes phase inversions complementary to those to which the audio signal has been subjected at the transmitter. Each time a phase inversion takes place, the signal is at a level other than zero potential and the distorted wave form of curve Z obtains. Such distortion gives rise to an objectionable "ping" in the reproduced audio and is attributable to the fact the D. C. component 11 of the coded signal of curve X has not been successfully transmitted and employed in reconstituting the intelligence in uncoded form. In accordance with the invention, this problem is overcome and ping effects are avoided by conveying the D. C. information to the receiver and adding it to the audio signal during the decoding process.

Figure 2:
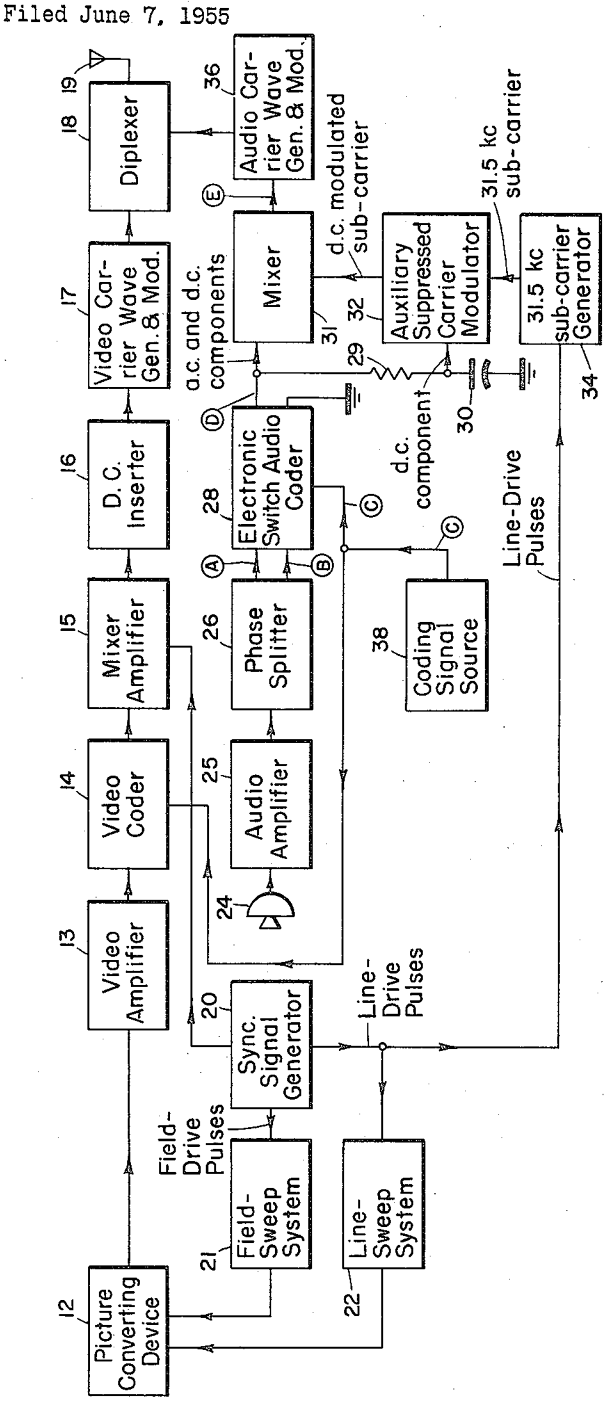
Figure 2 is a schematic representation of a subscription television transmitter constructed in accordance with the invention to avoid such distortion.

In the transmitter of Figure 2 a picture converting or pick-up device 12, which may be of any well-known construction, is connected through a video amplifier 13 and a video coder 14 to one pair of input terminals of a mixer amplifier 15. Video coder 14 may be similar to that disclosed and claimed in copending application Serial No. 243,039, filed August 22, 1951, in the name of Robert Adler, now Patent 2,758,153, dated August 7, 1956, assigned to the present assignee. Coder 14 may comprise a beam-deflection tube having a pair of output circuits which may be selectively coupled into the video channel as the electron beam is deflected from one to the other of two target anodes coupled to such output circuits. One of these circuits includes a time-delay network so that the timing of the video components relative to the synchronizing components of the radiated signal varies as the beam of the deflection tube is switched between its anode. This switching effect is accomplished by means of a beam-deflection control or actuating signal applied to video coder 14, as explained hereinafter. Such intermittent variations in the relative timing of the video and synchronizing components effectively code the picture information since conventional television receivers, not equipped with suitable video decoding apparatus, depend upon an invariant time relation of the video and synchronizing components of a received signal to reproduce the image intelligence represented thereby.

Mixer amplifier 15 is coupled through a direct current inserter 16 to a video carrier wave generator and modulator 17 which, in turn, is connected through a diplexer 18 to an antenna 19. The transmitter also includes a synchronizing-signal generator 20 which supplies the usual line- and field-synchronizing components and associated pedestal components to mixer 15. Generator 20 further supplies field- and line-drive pulses to a field-sweep system 21 and to a line-sweep system 22, respectively. The output terminals of sweep systems 21 and 22 are connected respectively to the field and line-deflection elements (not shown) associated with picture-converting device 12.

A microphone 24 is connected through an audio amplifier 25 to the input circuit of a phase splitter 26 which has a balanced output circuit connected to an electronic switch audio coder 28. Phase splitter 26 delivers the audio signal to one input of coder 28 with no phase change while simultaneously applying the signal to another input with a 180° phase change. Coder 28 may be conventional in construction or may take the form of that described and claimed in copending application Serial No. 440,224, filed June 29, 1954, in the name of Robert Adler, and assigned to the present assignee; it operates in response to an applied control or coding signal to translate the audio signal to its output circuit with a change in phase in successive half cycles of the coding signal. The coded audio signal developed in coder 28 has a D. C. or very low frequency component.

Coder 28 is connected to one input circuit of a mixer 31 and has a series-connected resistor 29 and a condenser 30 coupled across its output terminals. Condenser 30 develops a charge corresponding to the D. C. component of the coded audio signal developed in coder 28 and serves as a modulating signal source for an auxiliary suppressed carrier amplitude modulator 32 by virtue of a connection from the junction of resistor 29 and condenser 30 to the modulating input circuit of the modulator. A 31.5 kilocycle sub-carrier oscillator 34 has its synchronizing input circuit connected to synchronizing-signal generator 20 and has its output connected to another input circuit of modulator 32 to supply a 31.5 kilocycle sub-carrier wave thereto. Oscillator 34 operates at twice the line-scanning frequency of the television transmitter and is synchronized by the line-drive pulses from generator 20. The output circuit of modulator 32 is connected to another input circuit of mixer 31 to supply thereto the 31.5 kilocycle sub-carrier wave amplitude modulated by the D. C. component of the coded audio signal from switch tube 28. The output signal from mixer 31 is supplied as a modulating signal to an audio carrier wave generator and modulator 36 which is coupled to another input circuit of diplexer 18.

Preferably, the time constant of the circuits from which the D. C. modulated sub-carrier is derived is matched or made complementary to the time constant of the entire translating channel for the coded A. C. components from coder 28 at the transmitter to a corresponding decoder at the receiver; otherwise the rate of change of the D. C. component will be incorrect and proper compensation will not be achieved.

A source 38 supplies a coding signal of square wave form to audio coder 28 and also to the deflection-control electrodes of video coder 14 to accomplish both picture and sound coding. The manner in which the coding signal is developed and conveyed to the receivers is entirely immaterial to the present invention. Copending application Serial No. 366,727, filed July 8, 1953, in the name of Erwin M. Roschke, and assigned to the present assignee, shows one coding signal source suitable for use as unit 38. Briefly, a counting device responds to line-synchronizing pulses to develop a square wave signal having amplitude changes every 15 line-trace intervals. During field-retrace intervals random code pulses are developed and supplied to various input circuits of a bi-stable multivibrator to effect actuation thereof in random fashion. The counting device is rephased during each field-retrace interval under the control of the bi-stable multivibrator and thus the square wave signal from the counter is phase modulated in random manner.

In operation, picture converting or pick-up device 12 produces video components representing the program information to be televised and these components, after amplification in video amplifier 13, are supplied through video coder 14 to mixer amplifier 15. Meanwhile, coding signal source 38 develops a square wave coding signal which is applied as a deflection-control signal to video coder 14 to alternately insert and remove the video delay line effectively to vary the time relation of the video and synchronizing components from time to time as described in the aforementioned Roschke application, Serial No. 366,727.

Mixer amplifier 15 also receives the customary line- and field-synchronizing and blanking pulses from generator 20 which it adds into the video signal from coder 14 so that a coded composite television signal is developed therein. That signal is adjusted as to background level in direct-current inserter 16 and is amplitude modulated on a picture carrier wave in unit 17. The modulated video carrier is supplied through diplexer 18 to antenna 19 for transmission to subscriber receivers. It will, of course, be understood that in the generation of the video components, sweep systems 21 and 22 are synchronized by the field- and line-drive pulses applied thereto by generator 20.

The audio information accompanying the video information is picked up by microphone 24 and supplied to audio amplifier 25. Phase splitter 26 receives the audio signal from amplifier 25 and supplies it in push-pull relation to unit 28 wherein audio coding takes place.

Figure 3:
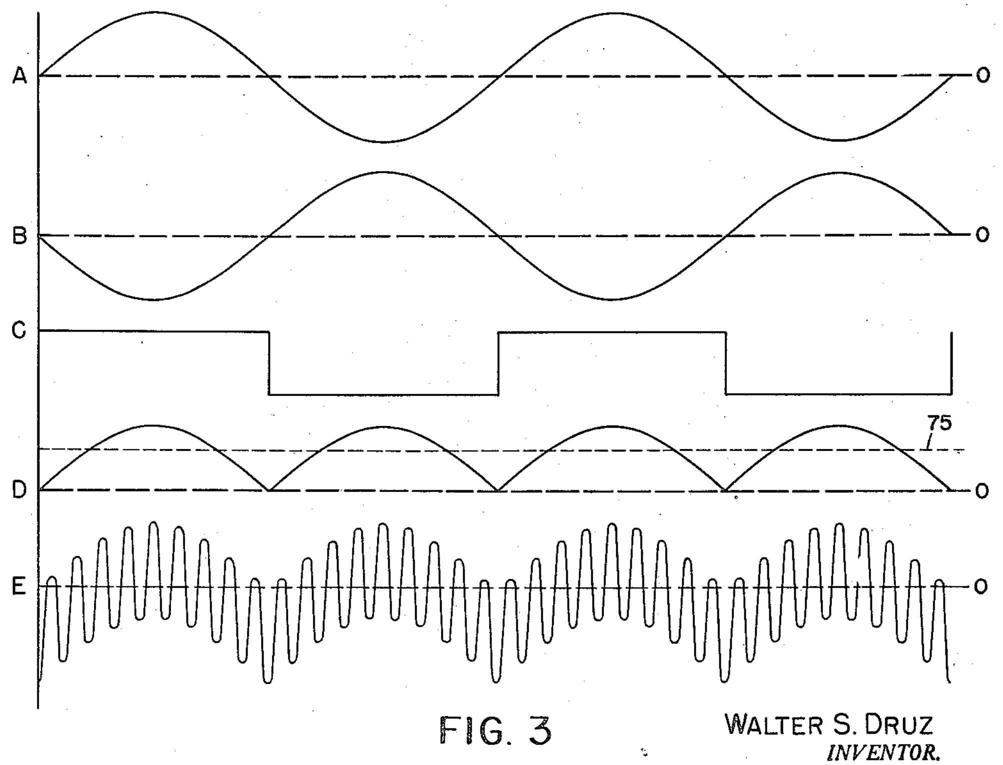
Figure 3 shows various waveforms useful in explaining the operation of the transmitter of Figure 2.

In order to simplify a detailed explanation of the audio coding process, idealized signal wave forms which appear at certain points within the audio section indicated by encircled reference letters are identified by corresponding designations in Figure 3. Assume that the coding square wave signal from source 38 has a frequency of approximately 500 cycles per second and that the representative audio signal of curve A is of the same frequency. The signals of curves A and B represent the output of phase splitter 26 which is applied, push-pull, to audio coder 28. Assume further that the amplitude changes of the coding square wave occur in substantial time coincidence with the zero cross-over points of the signals of curves A and B, as shown by curve C. Audio coder 28, in response to the coding square wave, translates only selected half cycles of the signals of curves A and B, for example the positive half cycles, to its output circuit to develop therefrom the output signal of curve D. This signal is the coded audio; it corresponds to the signal of curve X discussed above and, as may be demonstrated by a Fourier analysis, it has a D. C. term or component indicated by dashed construction line 75. Condenser 30 in the output of the audio coder charges to the potential level of dashed line 75 in curve D and this potential is employed to amplitude modulate the 31.5 kilocycle sub-carrier in modulator 32. The D. C. modulated sub-carrier is combined with the A. C. component of the coded audio in mixer 31 to develop the signal of curve E which, in turn, is frequency modulated on the main sound carrier in unit 36 and applied through diplexer 18 to antenna 19 from which it is concurrently radiated with the modulated video carrier. Thus, the coded audio signal is represented by a complex modulation of the main sound carrier by virtue of which both the A. C. and D. C. components of the coded audio signal constitute separate modulations of that carrier. In this manner all components of the coded signal necessary to recover the original audio at the receiver, in a manner to be explained, are included in the transmission.

Figure 4:
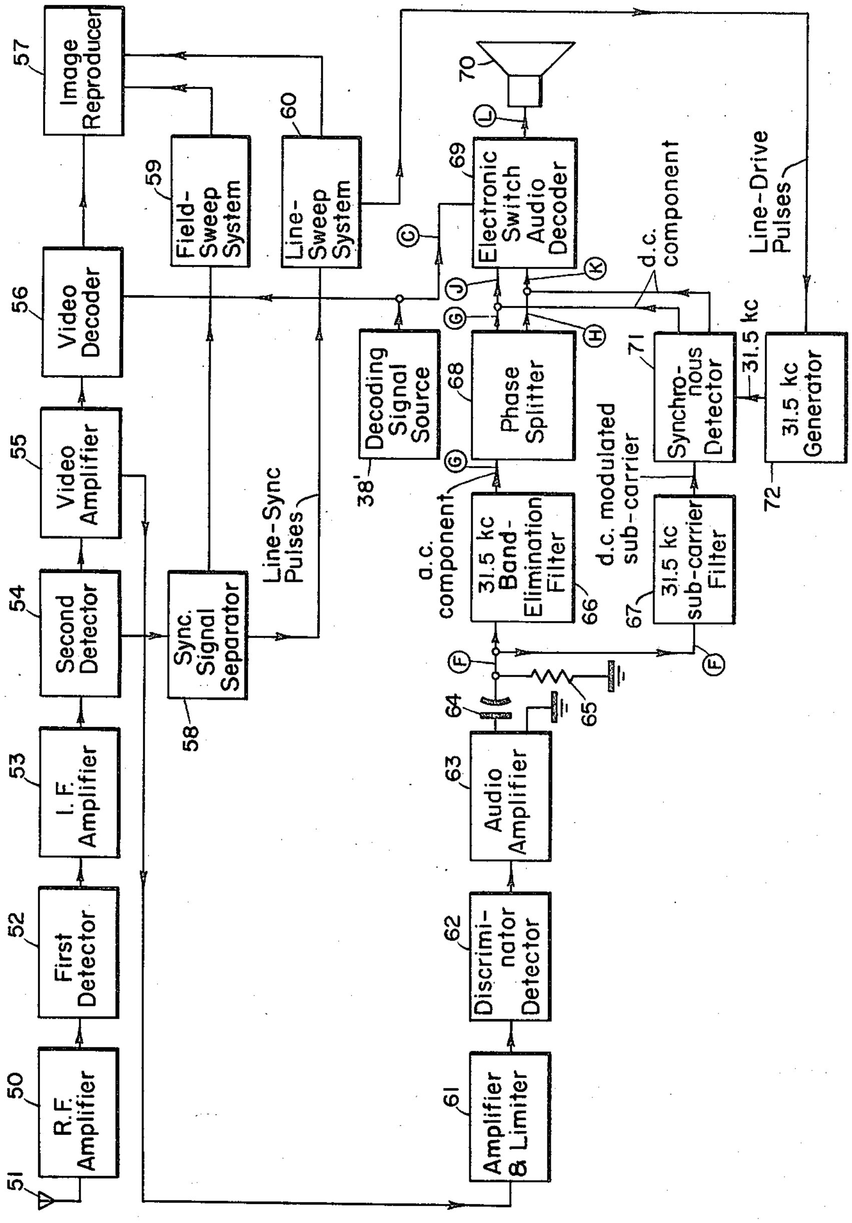
Figure 4 is a representation of an accompanying subscription television receiver which, taken in conjunction with the transmitter of Figure 2, illustrates a complete communication system embodying the invention.

The receiver of Figure 4 is constructed in accordance with the invention to decode especially the coded audio signal radiated by the transmitter of Figure 2. The receiver comprises a radio-frequency amplifier 50 having input terminals connected to an antenna 51 and output terminals connected to a first detector 52. Detector 52 is connected to an intermediate-frequency amplifier 53 which, in turn, is connected to a second detector 54 having output terminals connected to a video amplifier 55. Amplifier 55 is connected through a video decoder 56 to the input electrodes of a cathode-ray image-reproducing device 57. Video decoder 56 may be similar to video coder 14 at the transmitter except that it is controlled to operate in a complementary fashion in order effectively to compensate for variations in the timing of video and synchronizing components of the received television signal.

Second detector 54 is also coupled to a synchronizing-signal separator 58 which has output circuits connected to a field-sweep system 59 and to a line-sweep system 60. The output terminals of sweep systems 59 and 60 are connected respectively to field- and line-deflection elements (not shown) associated with reproducing device 57.

Video amplifier 55 is also connected to an amplifier and amplitude limiter 61 which, in turn, is coupled through a discriminator detector or demodulator 62 to an audio amplifier 63. A condenser 64 and a resistor 65 are connected in series across the output circuit of amplifier 63 and the junction of the condenser and resistor is coupled to the input circuit of a 31.5 kilocycle band-elimination filter 66 and to a 31.5 kilocycle sub-carrier filter 67. A phase splitter 68 is connected to band-elimination filter 66 and has a balanced output circuit connected to respective input circuits of an electronic switch audio decoder 69. Decoder 69 has its output circuit connected to a speaker 70 and may be identical in construction to audio coder 28 at the transmitter so that when actuated by a decoding signal corresponding to that which controls audio coding, it effects compensating phase inversions of the coded audio signal in time coincidence with like phase inversions at the transmitter.

A synchronous detector or demodulator 71 has one input circuit connected to filter 67 to receive the D. C. modulated sub-carrier and has another input circuit connected to a 31.5 kilocycle generator or oscillator 72 which, in turn, is coupled to line-sweep system 60 to receive line-drive pulses for synchronizing purposes. Detector 71 has a balanced output circuit and impresses the D. C. component of the coded audio signal with positive polarity to one input of decoder 69 and with negative polarity to another input of decoder 69. A decoding signal source 38′, similar to unit 38 of the transmitter, is connected to audio decoder 69 and to video decoder 56 to provide a control signal of identical wave form to that supplied to the corresponding circuits at the transmitter. The square wave signal developed in unit 38′ may be synchronized and phased with relation to the coding square wave of the transmitter by means of signal bursts transmitted along with the television signal during the vertical-retrace intervals, as is described in detail in the aforementioned Roschke application, Serial No. 366,727.

In the operation of the described receiver, the coded television signal is intercepted by antenna 51, amplified in radio-frequency amplifier 50 and heterodyned to the selected intermediate frequency of the receiver in first detector 52. The resulting intermediate-frequency signal is amplified in intermediate-frequency amplifier 53 and detected in second detector 54 to produce the coded composite video signal. This latter signal is amplified in video amplifier 55, translated through video decoder 56, and impressed on the input electrodes of image reproducer 57 to control the intensity of the cathode-ray beam thereof in well-known manner. Video decoder 56 receives a decoding signal from source 38′ which has amplitude variations occurring in exact time coincidence with amplitude excursions of the coding signal applied as a deflection-control signal to the video coder in the transmitter. The decoding signal is likewise utilized for deflection control so that the video components as applied to the input electrodes of image-reproducing device 57 are suitably compensated or decoded as required to effect intelligible image reproduction.

The synchronizing components of the received signal are separated in separator 58, the field-synchronizing components being utilized to synchronize sweep system 59 and, therefore, the field scansion of the image reproducer while the line-synchronizing pulses are utilized to synchronize sweep system 60 and, therefore, the line scansion of device 57.

Figure 6:
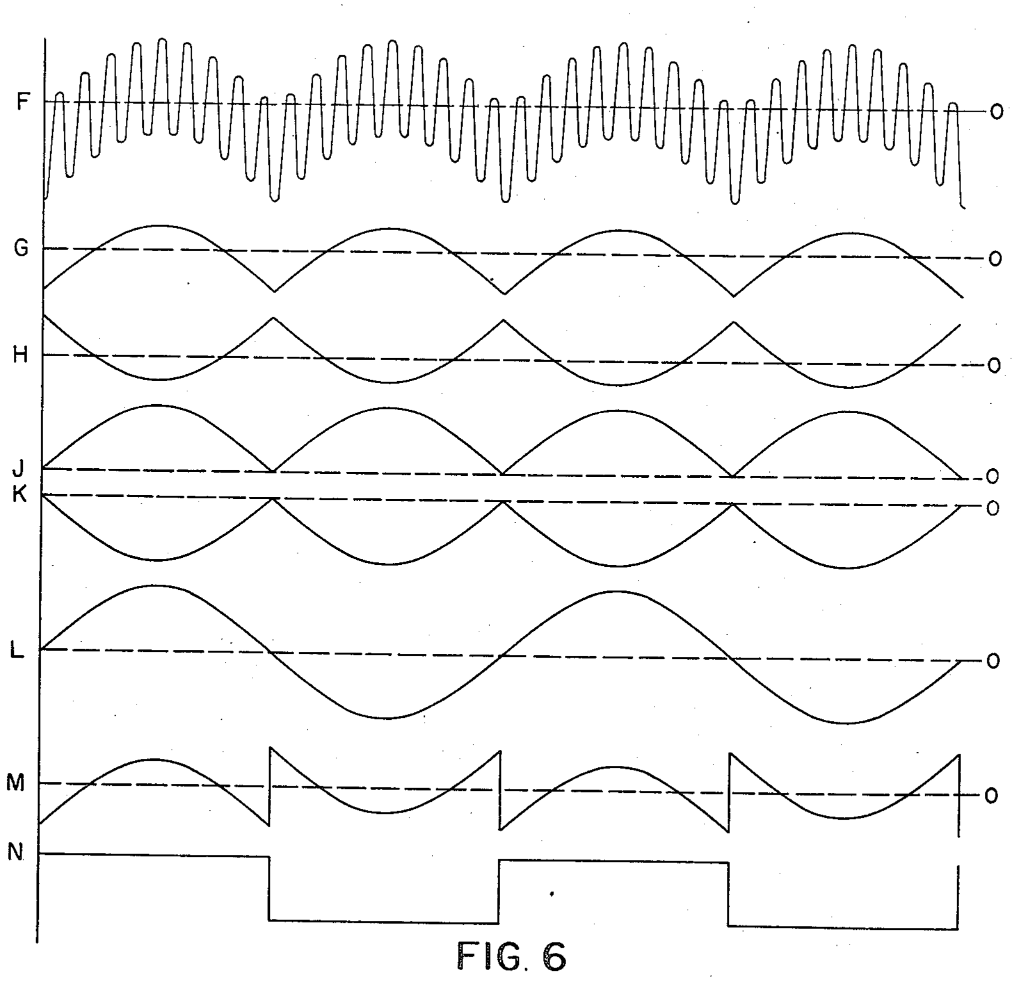
Figure 6 comprises various curves useful in explaining the operation of the receivers disclosed in Figures 4 and 5.

An intercarrier sound signal, frequency modulated with the components of the coded audio, is developed in detector 54 and separated out in video amplifier 55 in accordance with intercarrier sound principles. The intercarrier signal is amplified and amplitude limited in unit 61, detected in demodulator or discriminator detector 62, and amplified in audio amplifier 63 to develop the signal of curve F of Figure 6 which, of course, is the same as the signal of curve E developed in the output of mixer 31 at the transmitter. The audio sections of conventional receivers employ A. C. interstage coupling circuits as indicated by condenser 64 so that the D. C. component of the audio, even if it is transmitted, is usually lost at the receiver.

Band-elimination filter 66 receives the signal of curve F from amplifier 63 but, in view of its frequency response, translates only the A. C. component of the coded audio signal, shown in curve G, to phase splitter 68. The D. C. modulated sub-carrier is rejected at this point. The output signal from the phase splitter, applied in push-pull relation to decoder 69, is represented by curves G and H.

At the same time, the signal of curve F from amplifier 63 is also supplied to sub-carrier filter 67 wherein the A. C. component is rejected while the D. C. modulated, 31.5 kilocycle sub-carrier is passed along to detector 71. A 31.5 kilocycle signal from oscillator 72 is concurrently applied to synchronous detector 71 which operates in well-known manner to produce the D. C. component of the coded audio conveyed as a modulation of the sub-carrier. A balanced output is obtained from detector 71 and combined with the signals of curves G and H to develop the signals of curves J and K for application to the input circuits of audio decoder 69.

Audio decoder 69, being under the control of a decoding signal from source 38' which is properly related to the signal controlling the audio coder at the transmitter, operates in time coincidence with audio coder 28 at the transmitter and applies in alternation selected portions of the signals of curves J and K to speaker 70. The selected portion corresponds to 180 electrical degrees of a sine wave so that the signal of curve L is developed for application to the speaker. It is a simulation of the original audio signal of curve A which was coded and then radiated at the transmitter. By including the D. C. component in the signal operated on by the audio decoder, the phase inversions occur at the zero signal points and the distortion effects otherwise encountered, if the D. C. component is neglected, are avoided.

In addition to the distortion caused by omission of the D. C. component, which may be eliminated in accordance with the present invention, another type of distortion may arise from the described coding process. It is in the nature of a switching transient introduced by the switching processes of both the audio coder and decoder units. This transient may be suppressed at the transmitter by means of a sampling circuit and low-pass filter inserted between coder 28 and mixer 31, and at the receiver by interposing a similar sampling circuit and a low-pass filter between decoder 69 and speaker 70 in accordance with the teachings of copending application Serial No. 397,176, filed December 9, 1953, in the name of Howard K. Van Jepmond, and assigned to the present assignee. The sampler may be phased by means of a sampling signal harmonically related to the coding and decoding signals so that the audio signal is only sampled at times other than the instants of phase inversion. In this way, the signal is sampled only during intervals in which no switching transients are present. The sampled signal is then shaped in the low-pass filter.

By way of summation, discriminator detector 62 constitutes first demodulating means for deriving the separate modulations of the transmission, namely, the A. C. component and the D. C. modulated sub-carrier. Decoding signal source 38', filter 66, phase splitter 68 and decoder 69 may collectively be considered as apparatus for performing a decoding function which is complementary to that to which the audio signal has been subjected at the transmitter. Filter 67, synchronous detector 71, generator 72, plus units 38', 66, 68 and 69 represent second demodulating means, including the decoding apparatus, which responds conjointly to the separate modulations of the transmission for deriving a demodulated signal corresponding to the original uncoded audio signal developed at the transmitter. Finally, audio amplifier 63 and the coupling to filter 66 and filter 67 constitute means for applying the separate modulations of the transmission to the second demodulating means.

Figure 5:
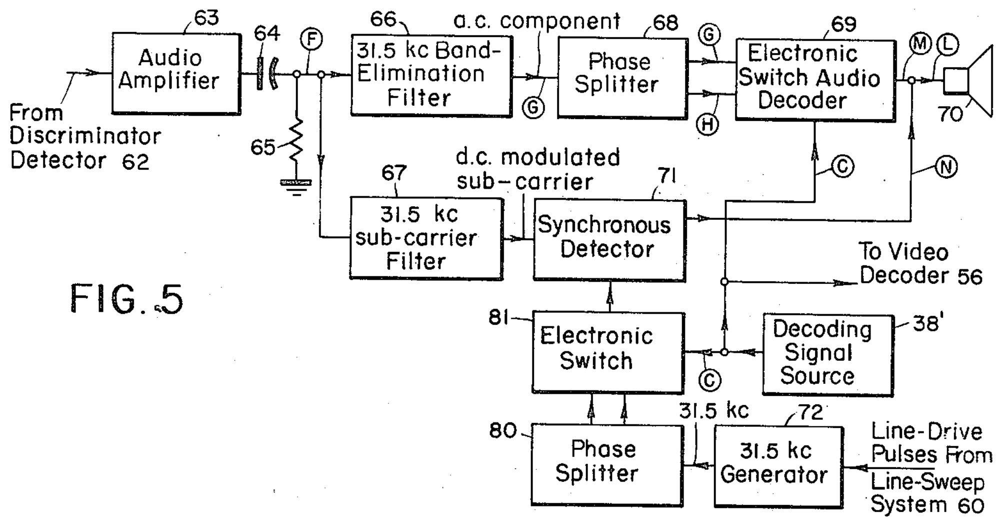
Figure 5 shows a modified portion of the receiver of Figure 4 constituting another embodiment of the invention.

A further variant of the invention is shown in Figure 5 to illustrate the manner in which the invention may be practiced without adding the D. C. component to the A. C. component of the coded audio at a point in the circuit prior to the audio decoder. In this modification, both the A. C. and D. C. components are decoded separately and added just before application to the speaker. The circuits in Figure 5 which correspond to those of Figure 4 are identified by similar reference numerals.

More specifically, phase splitter 68 responds as before to the A. C. component to apply the signals of curves G and H to decoder 69. However, since the D. C. component has not been introduced into the signal operated upon by decoder 69, the phase inversions effected in response to the decoding signal from source 38' do not occur at zero signal points and the distorted signal of curve M results. It is the same distorted signal represented in curve Z of Figure 1 and considered above. At the same time, however, generator 72 supplies a 31.5 kilocycle reference signal to a phase splitter 80 which supplies the 31.5 kilocycle subcarrier, push-pull, to input circuits of an electronic switch 81. This switch is actuated by the decoding signal from source 38' and delivers to detector 71 the 31.5 kilocycle signal in one phase during one half cycle of the decoding square wave and in opposite phase during the other half cycle of the wave which, of course, is represented by curve C of Figure 3. During intervals when the 31.5 kilocycle signal is in phase with that supplied from filter 67, they effectively add to produce positive pulse components, whereas during the alternate intervals when the 31.5 kilocycle signal from switch 81 is of opposite phase from that provided by filter 67 subtraction takes place to produce negative pulse components. The net output signal is a square wave shown in curve N having a magnitude determined by the D. C. component. By adding the signals of curves M and N before application to speaker 70, the signal of curve L is developed which, as mentioned before, corresponds to the original audio signal at the transmitter.

The invention therefore provides an arrangement for translating a D. C. component. When incorporated in a subscription television system the arrangement prevents distortion in a decoded signal which normally arises due to the inability to transmit and reproduce the D. C. component of a signal coded in the described manner.

While particular embodiments of the invention have been shown and described, modifications may be made, and it is intended in the appended claims to cover all such modifications as may fall within the true spirit and scope of the invention.

I claim:

1. A receiver for utilizing a transmission representing an uncoded intelligence signal which has been subjected to a coding function and converted into a coded intelligence signal having an A. C. component and a D. C. component, in which transmission said D. C. component is represented by modulation of a carrier wave and said A. C. component is represented by separate modulation of a carrier wave, said receiver comprising: first demodulating means for deriving said A. C. component and said D. C. modulated carried wave; decoding apparatus for performing a decoding function which is complementary to said coding function; second demodulating means, including said decoding apparatus, responsive conjointly to said A. C. component and said D. C. modulated carrier wave for deriving a demodulated signal corresponding to said uncoded intelligence signal; and means for applying said A. C. component and said D. C. modulated carrier wave to said second demodulating means.

2. A receiver for utilizing a transmission representing an uncoded audio signal which has been subjected to a coding function and converted into a coded audio signal having an A. C. component and a D. C. component which components are individually represented by separate modulations of a main carrier wave included within said transmission, with the D. C. component modulated on a sub-carrier wave forming a D. C. modulated sub-carrier wave, said receiver comprising: first demodulating means for demodulating said main carrier wave to derive said A. C. component and said D. C. modulated sub-carrier wave; decoding apparatus for performing a decoding function which is complementary to said coding function; second demodulating means, including said decoding apparatus, responsive conjointly to said A. C. component and said D. C. modulated sub-carrier wave for deriving a demodulated signal corresponding to said uncoded audio signal; and means coupling said first demodulating means to said second demodulating means for applying said A. C. component and said D. C. modulated sub-carrier wave to said second demodulating means.

3. A receiver for utilizing a transmission representing an uncoded audio signal which has been subjected to a coding function and converted into a coded audio signal having an A. C. component and a D. C. component which components are individually represented by separate modulations of a main carrier wave included within said transmission, with the D. C. component modulated on a sub-carrier wave forming a D. C. modulated sub-carrier wave, said receiver comprising: a first demodulator for demodulating said main carrier wave to derive said A. C. component and said D. C. modulated sub-carrier wave; means including a second demodulator, coupled to said first demodulator for operating on said D. C. modulated sub-carrier to develop an output signal which is related to said D. C. component; decoding apparatus for performing a decoding function which is complementary to said coding function; and means, including said decoding apparatus, coupled to both of said demodulators for combining said A. C. component and said output signal and for deriving a signal corresponding to said uncoded audio signal.

4. A receiver for utilizing a transmission representing an uncoded audio signal which has been subjected to a coding function and converted into a coded audio signal having an A. C. component and a D. C. component which components are individually represented by separate modulations of a main carrier wave included within said transmission, with the D. C. component modulated on a sub-carrier wave forming a D. C. modulated sub-carrier wave, said receiver comprising: a first demodulator for demodulating said main carrier wave to derive said A. C. component and said D. C. modulated sub-carrier wave; means, including a second demodulator, coupled to said first demodulator for demodulating said D. C. modulating sub-carrier wave to derive said D. C. component; decoding apparatus for performing a decoding function which is complementary to said coding function; and means, including said decoding apparatus, coupled to both of said demodulators for combining said A. C. and D. C. components and for deriving a signal corresponding to uncoded audio signal.

5. A receiver for utilizing a transmission representing an uncoded audio signal which has been subjected to a phase inverting coding function and converted into a coded audio signal having a number of phase inversions occurring in accordance with a predetermined code schedule, said coded audio signal including an A. C. component and a D. C. component which components are individually represented by separate modulations included within said transmission, said receiver comprising: first demodulating means for deriving said separate modulations of said transmission; decoding apparatus for performing a phase inverting decoding function which is complementary to said coding function; second demodulating means, including said decoding apparatus, responsive conjointly to said separate modulations of said transmission for reinverting the phase of said coded audio signal at selected times determined by said predetermined code schedule and for deriving a demodulated signal corresponding to said uncoded audio signal; and means for applying said separate modulations of said transmission to said second demodulating means.

6. A receiver for utilizing a transmission representing an uncoded audio signal which has been subjected to a phase inverting coding function and converted into a coded audio signal having a number of phase inversions occurring in accordance with a predetermined code schedule and having an A. C. component and a D. C. component which components are individually represented by separate modulations of a main carrier wave included within said transmission, with the D. C. component modulated on a sub-carrier wave forming a D. C. modulated sub-carrier wave, said receiver comprising: a first demodulator for demodulating said main carrier wave to derive said A. C. component and said D. C. modulated sub-carrier wave; a phase splitter coupled to said first demodulator for simultaneously translating said A. C. component in opposed phases; means, including a second demodulator, coupled to said first demodulator for demodulating said D. C. modulated sub-carrier wave to derive said D. C. component; and means, including an electronic switch, coupled to said phase splitter and said second demodulator for selecting the phase condition of said A. C. component in accordance with said predetermined code schedule and to introduce said D. C. component to develop a signal corresponding to said uncoded audio signal.

7. A receiver for utilizing a transmission representing an uncoded audio signal which has been subjected to a phase inverting coding function and converted into a coded audio signal having a number of phase inversions occurring in accordance with a predetermined code schedule and having an A. C. component and a D. C. component which components are individually represented by separate modulations of a main carrier wave included within said transmission, with the D. C. component modulated on a sub-carrier wave forming a D. C. modulated sub-carrier wave, said receiver comprising: a first demodulator for demodulating said main carrier wave to derive said A. C. component and said D. C. modulated sub-carrier wave; a phase splitter coupled to said first demodulator for simultaneously translating said A. C. component with the same phase and with an inverted phase; means, including an electronic switch, coupled to said splitter for selecting the phase condition of said A. C. component in accordance with said predetermined code schedule to produce a signal related to said uncoded audio signal; a second demodulator coupled to said first demodulator; means coupled to said second demodulator for effecting actuation thereof in accordance with said predetermined code schedule to develop a signal representing said D. C. component; and means combining the signal from said second demodulator and the signal from said electronic switch to produce a composite signal which corresponds to said uncoded audio signal.

8. A subscription television receiver for utilizing a television transmission representing a video signal, a synchronizing signal and an audio signal which has been subjected to a coding function and converted into a coded audio signal having an A. C. component and a D. C. component which components are individually represented by separate modulations included within said television transmission, said receiver comprising: first demodulating means for deriving said separate modulations of said television transmission; decoding apparatus for performing a decoding function which is complementary to said coding function; second demodulating means, including said decoding apparatus, responsive conjointly to said separate modulations and also to said synchronizing signal of said television transmission for deriving a demodulated signal corresponding to said audio signal; and means for applying said separate modulations and said synchronizing signal of said television transmission to said second demodulating means.

9. A transmitter-receiver system comprising: a source of uncoded intelligence signal; coding apparatus coupled to said source for subjecting said intelligence signal to a coding function to convert said intelligence signal into a coded intelligence signal having an A. C. component and a D. C. component; means for transmitting said A. C. and D. C. components as separate modulations included within a transmission; first demodulating means for deriving said separate modulations of said transmission at said receiver; decoding apparatus for performing a decoding function which is complementary to said coding function; second demodulating means, including said decoding apparatus, responsive conjointly to said separate modulations of said transmission for deriving a demodulated signal corresponding to said uncoded intelligence signal; and means for applying said separate modulations of said transmission to said second demodulating means.

10. A transmitter-receiver system comprising: means for developing an uncoded audio signal; coding apparatus coupled to said developing means for subjecting said audio signal to a coding function and for effecting conversion thereof to a coded audio signal having an A. C. component and a D. C. component; means for modulating a sub-carrier wave with said D. C. component; means for modulating a main carrier with the D. C. modulated subcarrier wave and with said A. C. component; means for transmitting the modulated main carrier wave to a receiver; first demodulating means at said receiver for demodulating the modulated main carrier wave to derive said A. C. component and said D. C. modulated sub-carrier wave; second demodulating means for demodulating the D. C. modulated sub-carrier wave to derive said D. C. component; means for combining said A. C. and D. C. components at said receiver to form said coded audio signal; and decoding means coupled to said combining means for subjecting said coded audio signal to a complementary decoding function to develop said uncoded audio signal.

11. A transmitter comprising: means for developing an uncoded audio signal; coding apparatus including phase inverting means controlled in accordance with a predetermined code schedule for effecting conversion thereof to a coded audio signal having an A. C. component and a D. C. component; a sub-carrier generator for developing a sub-carrier signal; a sub-carrier modulator coupled to said sub-carrier generator; means for applying said D. C. component to said modulator to effect modulation of said sub-carrier signal with said D. C. component to develop a D. C. modulated sub-carrier wave; an adder for superimposing said A. C. component and said D. C. modulated sub-carrier wave; means coupled to said adder for modulating a main carrier wave with said D. C. modulated sub-carrier wave and said A. C. component; and means for transmitting the modulated main carrier wave to a receiver.

12. A transmitter-receiver system comprising: a source of uncoded audio signal; means including coding apparatus coupled to said source for subjecting said audio signal to a coding function to effect conversion thereof to a coded audio signal having an A. C. component and a D. C. component and for modulating a sub-carrier signal with said D. C. component to derive a D. C. modulated sub-carrier wave; means for modulating a main carrier with said D. C. modulated sub-carrier wave and with said A. C. component; means for transmitting the modulated main carrier wave to a receiver; first demodulating means at said receiver for demodulating the modulated main carrier wave to derive said A. C. component and said D. C. modulated sub-carrier wave; second demodulating means coupled to said first demodulating means for demodulating said D. C. modulated sub-carrier wave to derive said D. C. component; means for combining said A. C. and D. C. components at said receiver to form said coded audio signal, the time constant of said first-mentioned means being complementary to the net effective time constant of said main carrier modulating means, transmitting means, first demodulating means, second demodulating means and combining means; and decoding means coupled to said combining means for subjecting said coded audio signal to a decoding function complementary to said coding function to develop said uncoded audio signal.

References Cited in the file of this patent

UNITED STATES PATENTS

| | | |
|---|---|---|
| 2,567,545 | Brown | Sept. 11, 1951 |
| 2,635,140 | Dome | Apr. 14, 1953 |
| 2,664,460 | Roschke | Dec. 29, 1953 |